No. 865,154.
PATENTED SEPT. 3, 1907.
F. H. & J. D. BACHMAN.
CLUTCH.
APPLICATION FILED MAR. 8, 1907.
2 SHEETS—SHEET 1.
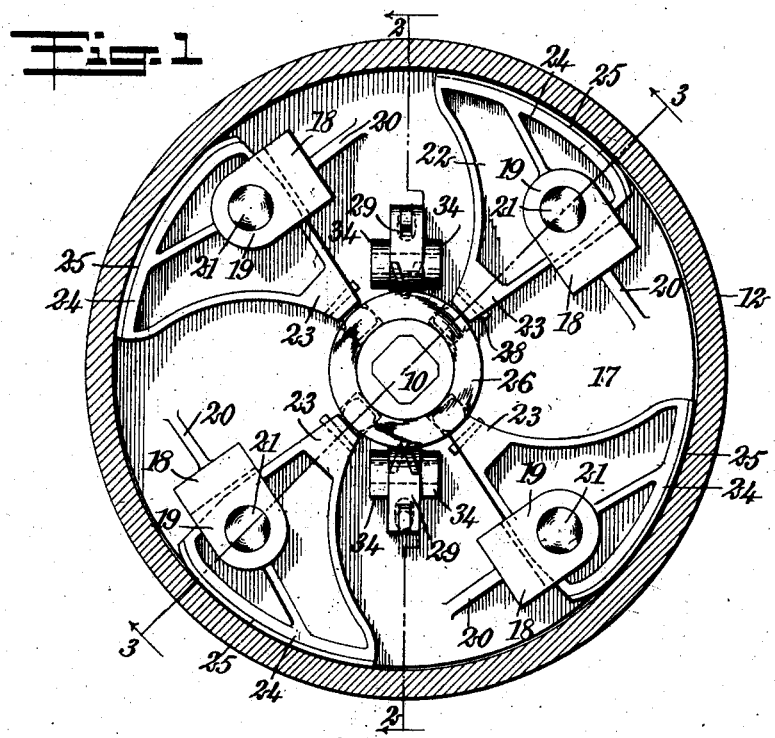
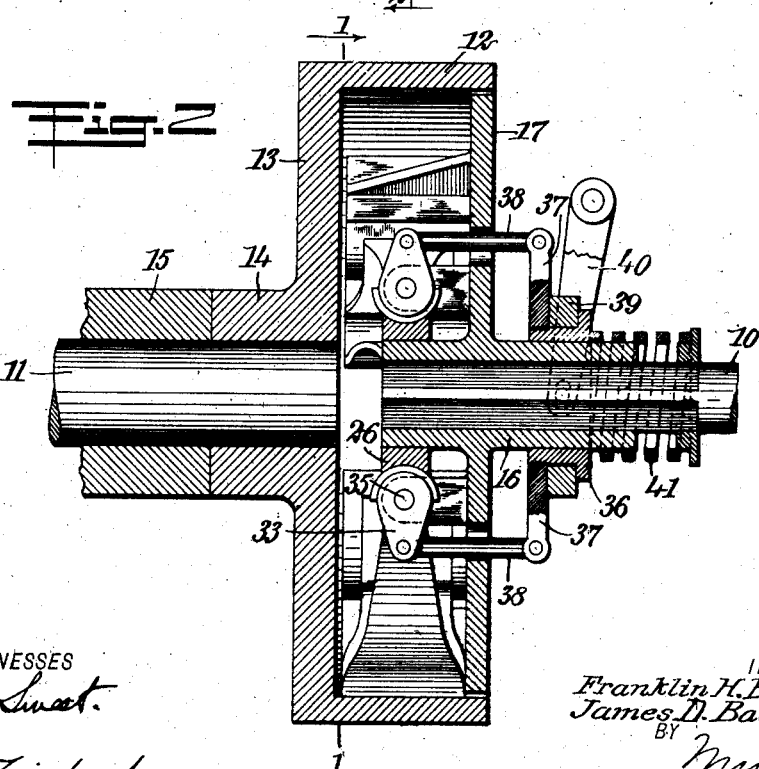
WITNESSES
F. D. Sweet.
C. W. Fairbank
INVENTORS
Franklin H. Bachman
James D. Bachman
BY
Munn & Co.
ATTORNEYS

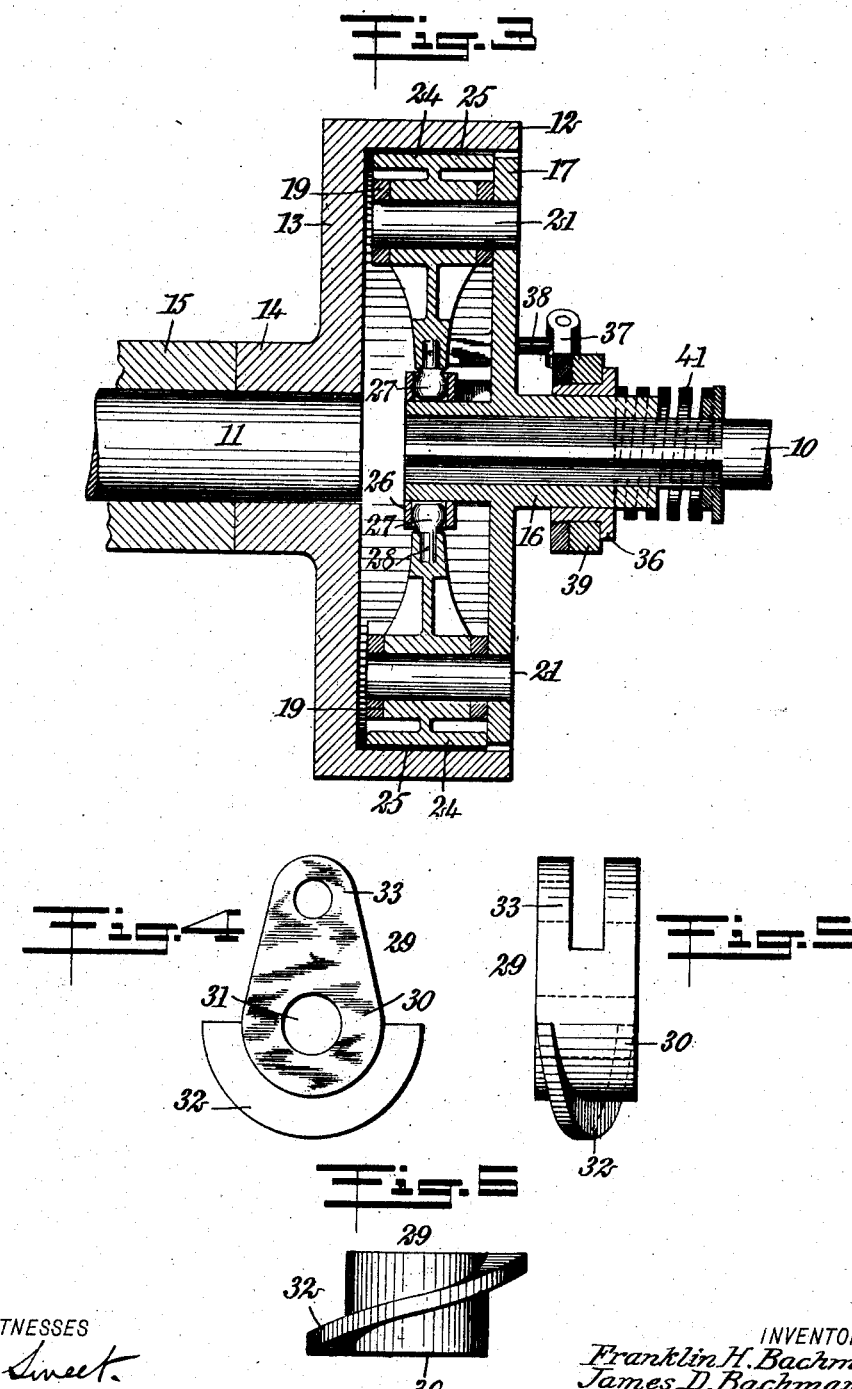

UNITED STATES PATENT OFFICE.

FRANKLIN H. BACHMAN, OF ALLENTOWN, AND JAMES D. BACHMAN, OF CATASAUQUA, PENNSYLVANIA.

CLUTCH.

No. 865,154.      Specification of Letters Patent.      Patented Sept. 3, 1907.

Application filed March 8, 1907. Serial No. 361,213.

*To all whom it may concern:*

Be it known that we, FRANKLIN H. BACHMAN, a resident of Allentown, in the county of Lehigh and State of Pennsylvania, and JAMES D. BACHMAN, a resident of Catasauqua, in the county of Lehigh and State of Pennsylvania, both citizens of the United States, have invented a new and Improved Clutch, of which the following is a full, clear, and exact description.

This invention relates to certain improvements in clutches, and more particularly to that type of clutch in which a plurality of movable shoes are supported adjacent and movable into engagement with a rotatable member, and the object of the invention is to provide certain improvements in the mechanism for supporting and operating these shoes.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, and in which Figure 1 is a transverse section through a clutch embodying our invention, said section being taken on the line 1—1 of Fig. 2; Fig. 2 is a central longitudinal section taken on the line 2—2 of Fig. 1; Fig. 3 is a central longitudinal section taken on the line 3—3 of Fig. 1; Fig. 4 is a front elevation of one of the members going to make up the operating mechanism; and Figs. 5 and 6 are side and end views, respectively, of the member shown in Fig. 4.

Our improved clutch is adapted for use in operatively connecting any suitable driving member to the corresponding driven member, said members preferably comprising shafts lying in alinement with each other. In the drawings we have illustrated two shafts 10 and 11, each of which carries certain portions going to make up the clutch. It is evident that either shaft may constitute the driving member and the other shaft constitute the driven member, but for definiteness in description we will hereinafter refer to the shaft 10 as constituting the driving member and the shaft 11 as the driven member. The shaft 11 is provided with a cylindrical casing keyed or otherwise rigidly secured thereto and comprising an outer cylindrical wall 12, an end plate 13 supporting said wall, and a collar 14 by which the plate is given an increased bearing surface upon the shaft 11. The shaft 11 is supported in any suitable manner, as, for instance, within a bearing block 15, and the collar 14 is secured to such a point along the length of the shaft as to leave the end of the shaft flush with the inner surface of the plate 13.

In alinement with the shaft 11 is the drive shaft 10 having an elongated collar or sleeve 16 rigidly secured thereto and carrying a plate 17 serving to close the end of the casing carried by the shaft 11 and lying substantially parallel to the opposite end plate 13. The collar 16 may, if desired, be keyed to the shaft, but preferably the shaft is formed substantially square in cross section and the opening through the collar formed of a corresponding shape, whereby all possibility of rotary movement of either the collar or the shaft in respect to the other is positively prevented. Extending inward from the surface of the plate 17 and preferably integral therewith we provide a plurality of inwardly extending brackets 18 carrying bearing plates 19 parallel to the end plate 17.

Integral with the brackets 18 and the end plate we provide braces 20, whereby the brackets may be more rigidly held in place and the lateral strain caused by the operation of the clutch better sustained. These brackets and bearing plates serve to support pins 21 extending inward from the plate 17 and lying parallel to the drive shaft 10. Upon each pin intermediate the end plate 17 and the bearing plate 19, we provide a shoe 22 so supported that its outer surface may be brought into or out of engagement with the inner surface of the cylindrical wall 12 by moving the shoe a short distance upon its pivot pin. The shoes 22 are preferably substantially L-shape in form with one portion 23 extending substantially radially in respect to the body of the clutch, and the other portion 24 being curved and lying closely adjacent the inner surface of the wall 12. The portion 24 is preferably provided with a facing plate 25 of leather, fiber, or other suitable material, whereby the shoe may be firmly gripped to the cylindrical wall of the casing when the shoe is moved about the pivot 21 to bring it in contact therewith.

Any suitable number of these shoes 22 may be employed but we preferably employ an even number, whereby the clutch is balanced at all times, and in a small ordinary form we would preferably employ four. The portions 24 of all of the shoes extend in the same circumferential direction from their pivot pins, and all of the pivot pins are located adjacent the corner or heel, so that by moving the inner ends of the radial portions 23 in the same circumferential direction, all of the shoes may be moved simultaneously and brought into engagement with the cylindrical wall 12. For causing the simultaneous movement of all of the shoes, we preferably provide a collar 26 rotatably mounted upon the inner end of the collar 16 and having recesses therein adapted to receive the ends of the portions 23.

To prevent lost motion and to facilitate the operation of the parts, we preferably provide the inner end of each shoe with an extension 27 rigidly secured thereto in any suitable manner, as, for instance, by means of a pin 28. The free end of each extension is substantially cylindrical in shape and forms with its corresponding recess in the collar, a ball and socket joint. By rotating the collar 26, the end portions 23 of the shoes are moved laterally in respect to their pivot pins and the engaging portions 24 of the shoes are moved upward or inward simultaneously to cause their engagement or disengagement with the cylindrical wall 12. For readily rotating the collar 26, we provide the outer circumferential face of the collar with oppositely disposed transverse grooves adapted to receive the helical extension of a member 29 similar to that illustrated in Figs. 4 to 6, inclusive. We preferably provide two of these members and each is provided with a body portion 30 having an opening 31 therethrough for a bearing pin, and having a helical extension 32 concentric with said opening. On the opposite side of the body portion we provide an extension or arm 33, whereby the member may be oscillated upon its bearing pin. The end plate 17 is provided with two inwardly extending lugs or ears 34 supporting a bearing pin 35, and these lugs or ears are so disposed in relation to the collar 26 that when the members 30 are mounted upon the pins 35 the helical extension 32 will lie in engagement with the grooves in the circumferential face of the collar 26.
Outside of the plate 17 and longitudinally movable upon the collar 16, we provide a collar 36 having outwardly extending arms 37 connected to the arms 33 of the members 30 by means of suitable connecting links 38. By moving the collar 36 longitudinally in respect to the plate 17, the members 30 are oscillated on their pivot pins, and the collar 26 is caused to rotate by the engagement of the helical portions 32 with the grooves in said collar. Any suitable means may be provided for operating the collar 36, but we preferably provide a collar 39 operatively connected to suitable yoke arms 40 and rotatably mounted in respect to the collar 36. A suitable spring 41 is preferably provided for holding the collar in such a position as to free the shoes from their engagement with the wall of the surrounding casing.

With the parts constructed and arranged in the manner above described, the collar 36 may be readily moved longitudinally to oscillate the members 30, and the oscillation of these members causes a rotation of the collar 26. This rotation causes a lateral movement of the inner portions 23 of each shoe and a corresponding outward movement of the engaging portions 24. As the shoes are carried by the driving member and the circumferential wall with which they engage is carried by the driven member, it is evident that the driven member may be firmly secured to the driving member or released therefrom by a short movement of the yoke arms 40.

Having thus described our invention, we claim as new and desire to secure by Letters Patent:

1. A clutch, comprising a casing having an inner contact surface, a plurality of shoes pivotally mounted adjacent said surface and having end portions extending inward radially in respect to the casing, a collar having a plurality of recesses, and a plurality of detachable extensions carried by said shoes at the inner ends thereof and terminating in balls normally mounted within said recesses.

2. A clutch, comprising a casing having an inner contact surface, a plurality of shoes pivotally mounted adjacent thereto, a rotatable collar in engagement with each of said shoes for forcing the latter into engagement with the contact surface, and longitudinally movable links substantially parallel to the axis of rotation of said collar and operatively connected to said collar for rotating the same.

3. A clutch, comprising a cylindrical casing having an inner contact surface, a plate forming an end wall for said casing, a plurality of shoes pivotally mounted upon said plate and adapted to engage with said casing, a sleeve forming a bearing for said plate and extending into said casing, a rotatable collar upon the inner end of said sleeve and in operative engagement with said shoes, a slidable collar concentric with said plate and adjacent thereto, and means connecting said collars whereby sliding movement of the outer collar causes a rotary movement of the inner collar and an engagement of the shoes with the contact surface.

4. A clutch, comprising a casing having an inner contact surface, a plate forming an end wall for said casing and having a plurality of shoes pivotally mounted thereon, a rotatable collar within said casing and in operative engagement with said shoes, a slidable collar outside of said casing, and means connecting said collars whereby a sliding movement of the last mentioned collar causes a rotary movement of the first mentioned collar and an engagement of the shoes with the contact surface.

5. A clutch, comprising a casing having an inner contact surface, a plurality of shoes pivotally mounted adjacent thereto, a rotatable collar in engagement with each of said shoes for forcing the same into engagement with the contact surface, and means for rotating said collar, said means comprising a member having a helical extension in engagement with said collar, and means for oscillating said member.

6. A clutch, comprising a casing having a contact surface, a plurality of shoes pivotally mounted adjacent thereto and adapted to engage therewith, a rotatable collar in engagement with each of said shoes for operating the latter, and means for rotating said collar, said means including a pivotally mounted member having a helical extension in engagement with said collar, a link connected to said member for oscillating the same, and means for moving said link longitudinally.

7. A clutch, comprising a casing having a cylindrical contact surface, an end plate supported adjacent said casing and unattached thereto, a plurality of shoes pivotally mounted upon said plate and adapted to engage with the inner surface of said casing, each of said shoes being provided with an inwardly extending portion radially disposed in respect to the casing, a rotatable collar having a ball and socket connection to each of said inwardly extending portions, a pivotally mounted member carried by said end plate and having a helical extension in engagement with the circumferential face of said collar, and means for oscillating said member to rotate the collar and force the shoes into engagement with the casing.

In testimony whereof I have signed my name to this specification in the presence of two subscribing witnesses.

FRANKLIN H. BACHMAN.
JAMES D. BACHMAN.

Witnesses:
G. J. S. KOHLER,
BENJ. F. BLANK.